US008191745B2

(12) United States Patent
Gray (10) Patent No.: US 8,191,745 B2
(45) Date of Patent: Jun. 5, 2012

(54) SECURED CHILDREN'S BOOK AND TOY HOLDER

(76) Inventor: Janice Everett Gray, Macon, GA (US)

(*) Notice: Subject to any disclaimer, the term of this patent is extended or adjusted under 35 U.S.C. 154(b) by 421 days.

(21) Appl. No.: 12/426,908

(22) Filed: Apr. 20, 2009

(65) Prior Publication Data

US 2010/0264181 A1  Oct. 21, 2010

(51) Int. Cl.
*B60R 9/048* (2006.01)

(52) U.S. Cl. ............ 224/409; 224/572; 224/901.8; 281/34; 297/188.2

(58) Field of Classification Search .......... 224/409, 224/411, 275, 572, 901.4, 901.8; 297/188.2, 297/188.04, 219.12, 256.17; 5/482; 281/4, 281/43, 46–48, 19.1, 31, 34; 446/227
See application file for complete search history.

(56) References Cited

U.S. PATENT DOCUMENTS

| 5,897,165 | A | * | 4/1999 | Kucharczyk et al. | 297/256.17 |
| 5,950,261 | A | * | 9/1999 | Hay et al. | 5/482 |
| 6,327,726 | B1 | * | 12/2001 | Weber | 5/655 |
| 6,428,098 | B1 | * | 8/2002 | Allbaugh | 297/219.12 |
| 6,702,381 | B2 | * | 3/2004 | Endicott et al. | 297/256.17 |
| 6,848,743 | B1 | * | 2/2005 | Collins | 297/256.17 |
| 2003/0227202 | A1 | * | 12/2003 | Endicott et al. | 297/256.17 |

* cited by examiner

*Primary Examiner* — Nathan J Newhouse
*Assistant Examiner* — Corey Skurdal

(57) ABSTRACT

The Secured Children's Book and Toy Holder that attaches to a child's car seat, stroller, or other children's transport device utilizing the Secured Children's Book and Toy Holder's seat belt harness connector loop and pads of mating hook and loop fastener material attachment ribbons that securely hold children's books and toys in a child's lap, preventing them from being dropped or thrown. The Secured Children's Book and Toy Holder is made of fabrics with strategically located reinforced button holes and a covered zippered back access panel to allow secure attachment of three books and/or multiple toys through the use of pads of mating hook and loop fastener material attachment ribbons.

3 Claims, 7 Drawing Sheets

SECURED CHILDREN'S BOOK AND TOY HOLDER

CROSS REFERENCE TO RELATED APPLICATIONS (Not Applicable)

STATEMENT OF FEDERALLY SPONSORED RESEARCH/DEVELOPMENT (Not Applicable)

REFERENCE TO A "SEQUENCE LISTING," A TABLE OR A COMPUTER PROGRAM LISTING APPENDIX SUBMITTED ON A COMPACT DISC AN INCORPORATION BY REFERENCE OF THE MATERIAL ON THE COMPACT DISC. THE TOTAL NUMBER OF COMPACT DISC INCLUDING DUPLICATES AND THE FILES ON EACH COMPACT DISC SHALL BE SPECIFIED (Not Applicable)

FIELD OF THE INVENTION

The present invention relates to the field of car seats, strollers, or other transport devices for children and more particularly, to the Secured Children's Book and Toy Holder for such a child's transport device.

BACKGROUND OF THE INVENTION

Car seats for children have been popular for many years, since the standard vehicle seats provided by car manufacturers are not well adapted to children. In most or all states, children's car seats have become mandatory under the law for children of about 5 years of age or younger or of a particular weight.

Parents traveling with their children by any one of the various types of the vast majority of road vehicles are usually very familiar with children's car seats. These car seats generally include restraining harnesses to secure a child into the car seat and seat belts or car straps that securely attach the car seat to the vehicle. As any parent knows, who travels in a vehicle with children, keeping the children entertained while restrained in a car seat is often a challenging, if not insurmountable task.

SUMMARY OF THE INVENTION

With the foregoing in mind, the present invention advantageously provides the Secured Children's Book and Toy Holder for a child's car seat, stroller, or other children's transport device. The Secured Children's Book and Toy Holder easily connects to standard car seat harnesses or seat belts and provides a place for the child to "read" attached books and play with attached toys without the fear or frustration of dropping or throwing the attached books or toys.

The present invention discloses the Secured Children's Book and Toy Holder that attaches to a child's car seat, stroller, or other children's transport device through usage of the Secured Children's Book and Toy Holder's seat belt harness connector loop and through the use of the Secured Children's Book and Toy Holder's pads of mating hook and loop fastener material attachment ribbons, which securely hold a child's books and toys in a child's lap, preventing them from being dropped or thrown. The Secured Children's Book and Toy Holder is made of fabrics with strategically located reinforced buttonholes and a covered zippered back access panel to allow secure attachment of three books and/or multiple toys through the use of pads of mating hook and loop fastener material attachment ribbons.

BRIEF DESCRIPTION OF THE DRAWINGS

Some of the features, advantages, and benefits of the present invention have been stated, others will become apparent as the description proceeds when taken in conjunction with the accompanying drawings in which.

DETAILED DESCRIPTION OF THE PREFERRED EMBODIMENT

The detailed invention will now be described more fully, hereinafter, with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
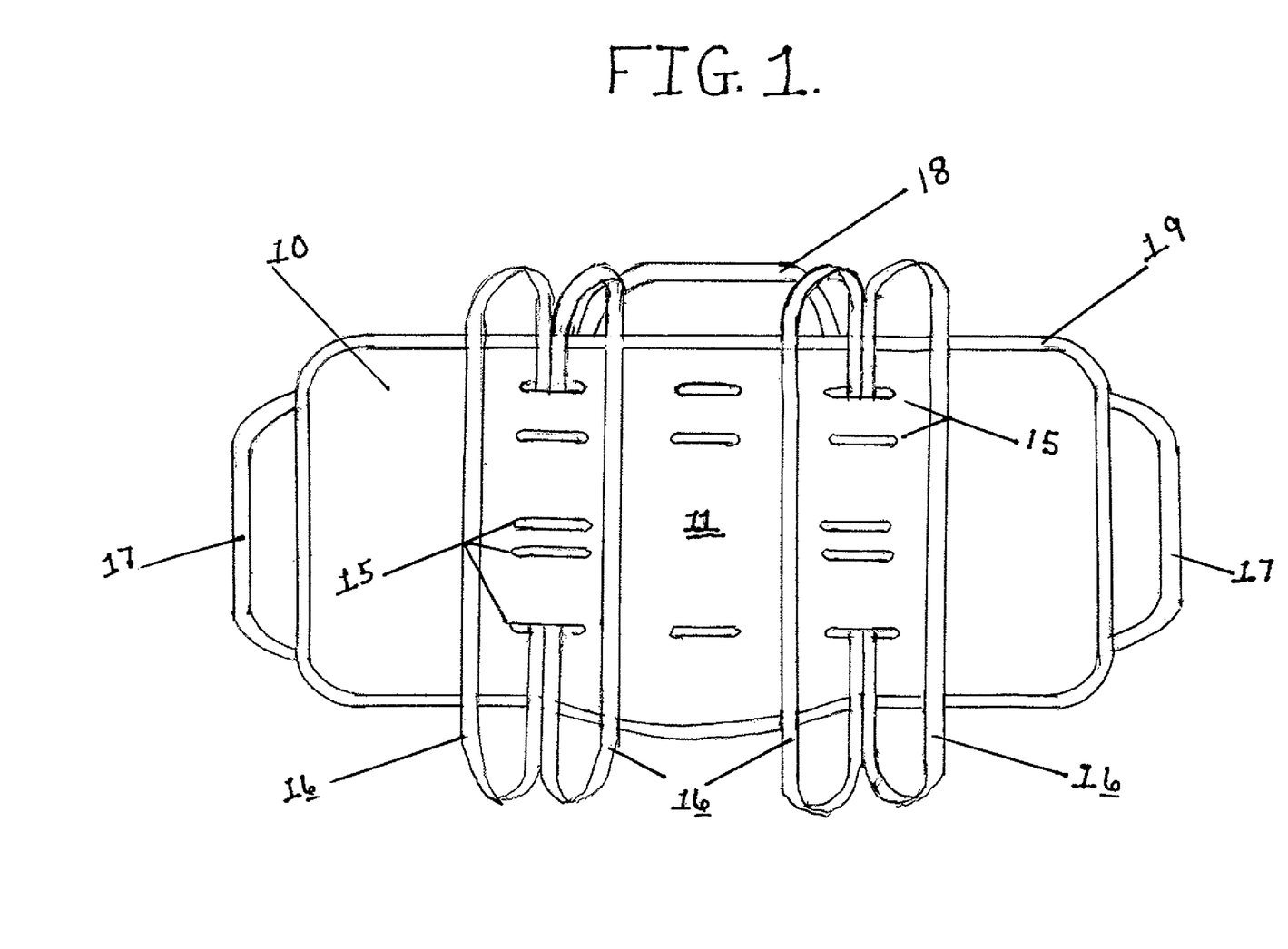
FIG. 1 is an outside plan view of the Secured Children's Book and Toy Holder (10) Top Panel (11) with pads of mating hook and loop fastener material connector (20) ribbons (16) according to an embodiment of the present invention.
Figure 2:
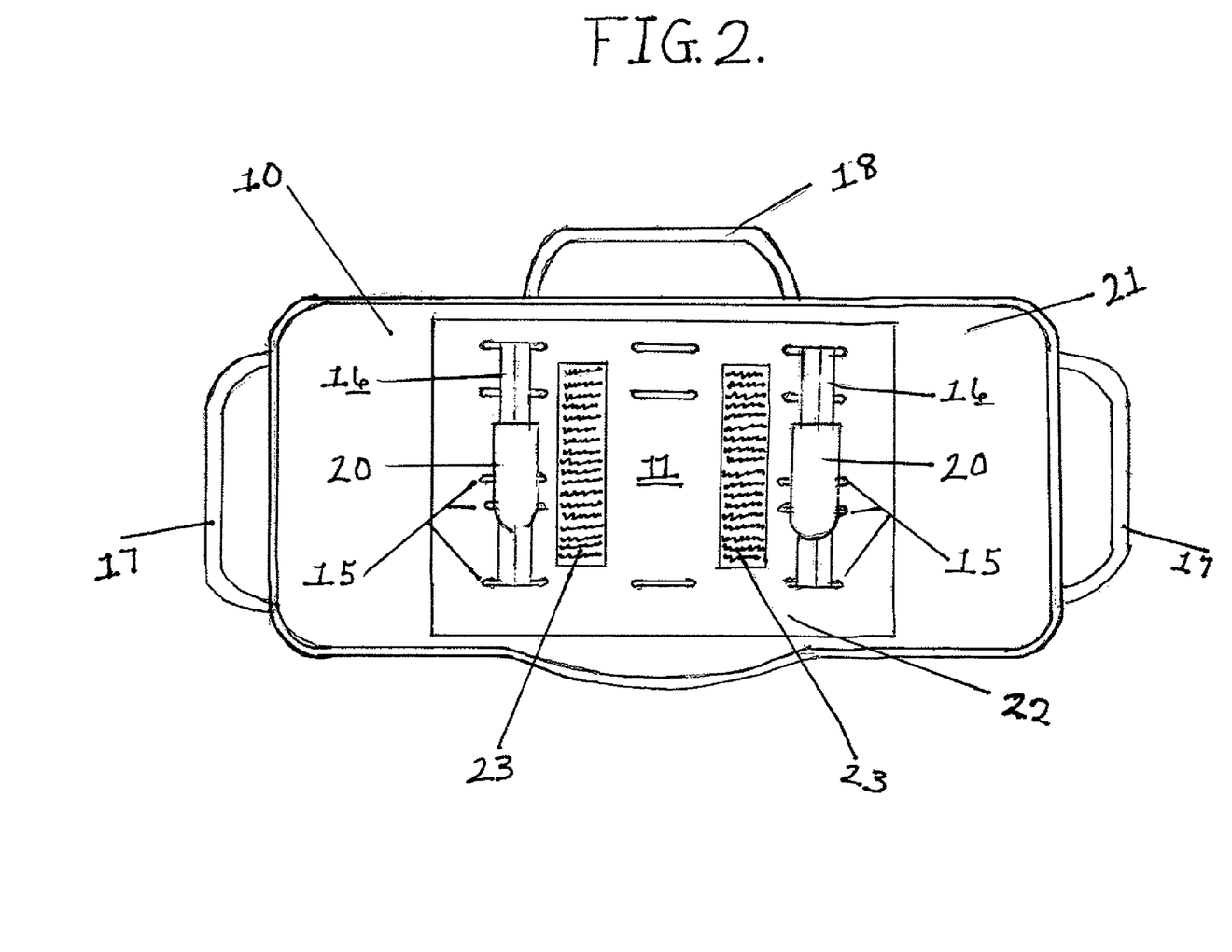
FIG. 2 is an inside plan view of an alternate embodiment of the Secured Children's Book and Toy Holder (10) Top Panel (11) with pads of mating hook and loop fastener material connector (20) ribbons (16) of FIG. 1.
Figure 3:
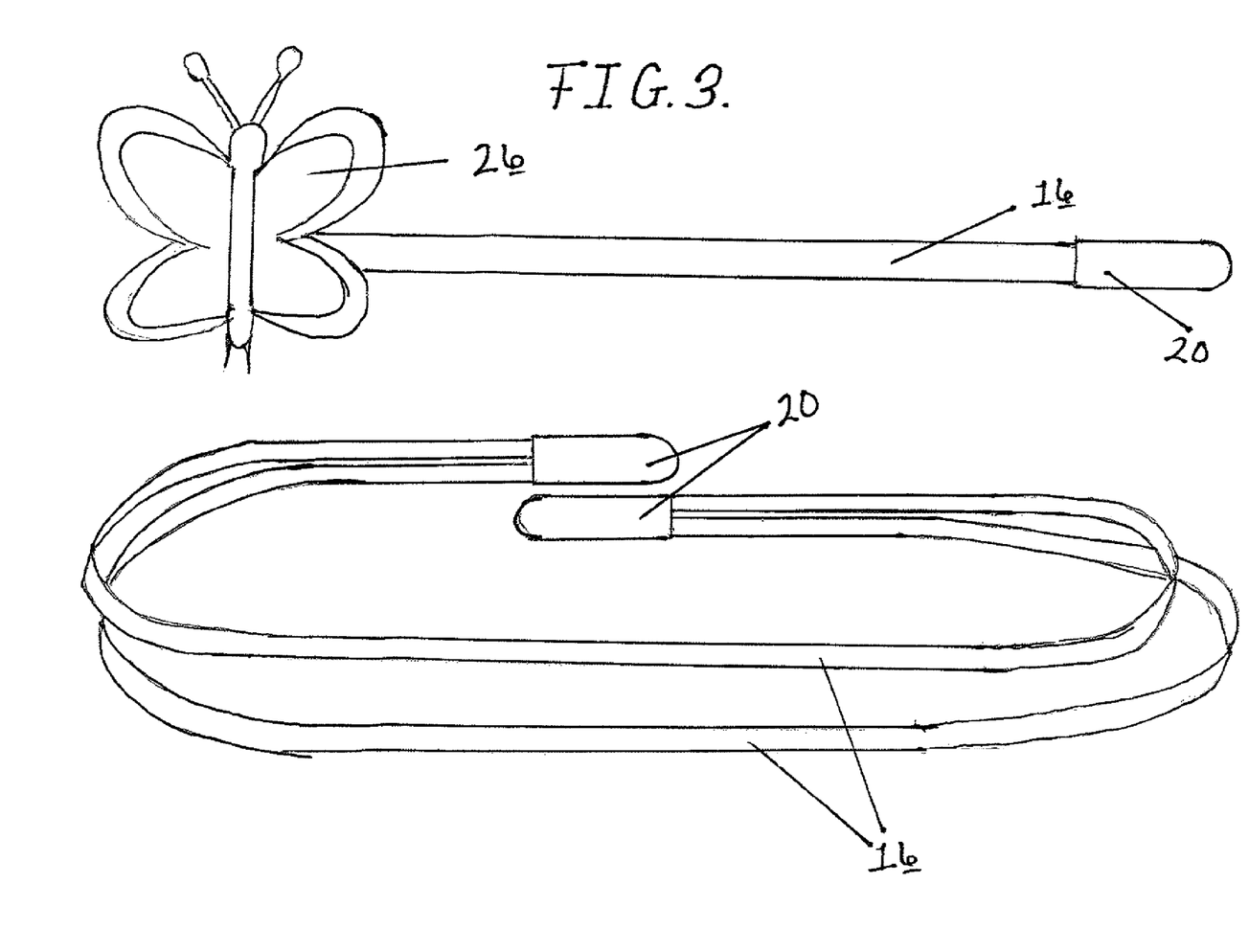
FIG. 3 is a top view of pads of mating hook and loop fastener material Connector (20) Ribbons (16) used to attached children's books (27) and toys (26) to the Secured Children's Book and Toy Holder (10) Top Panel (11)
Figure 4:
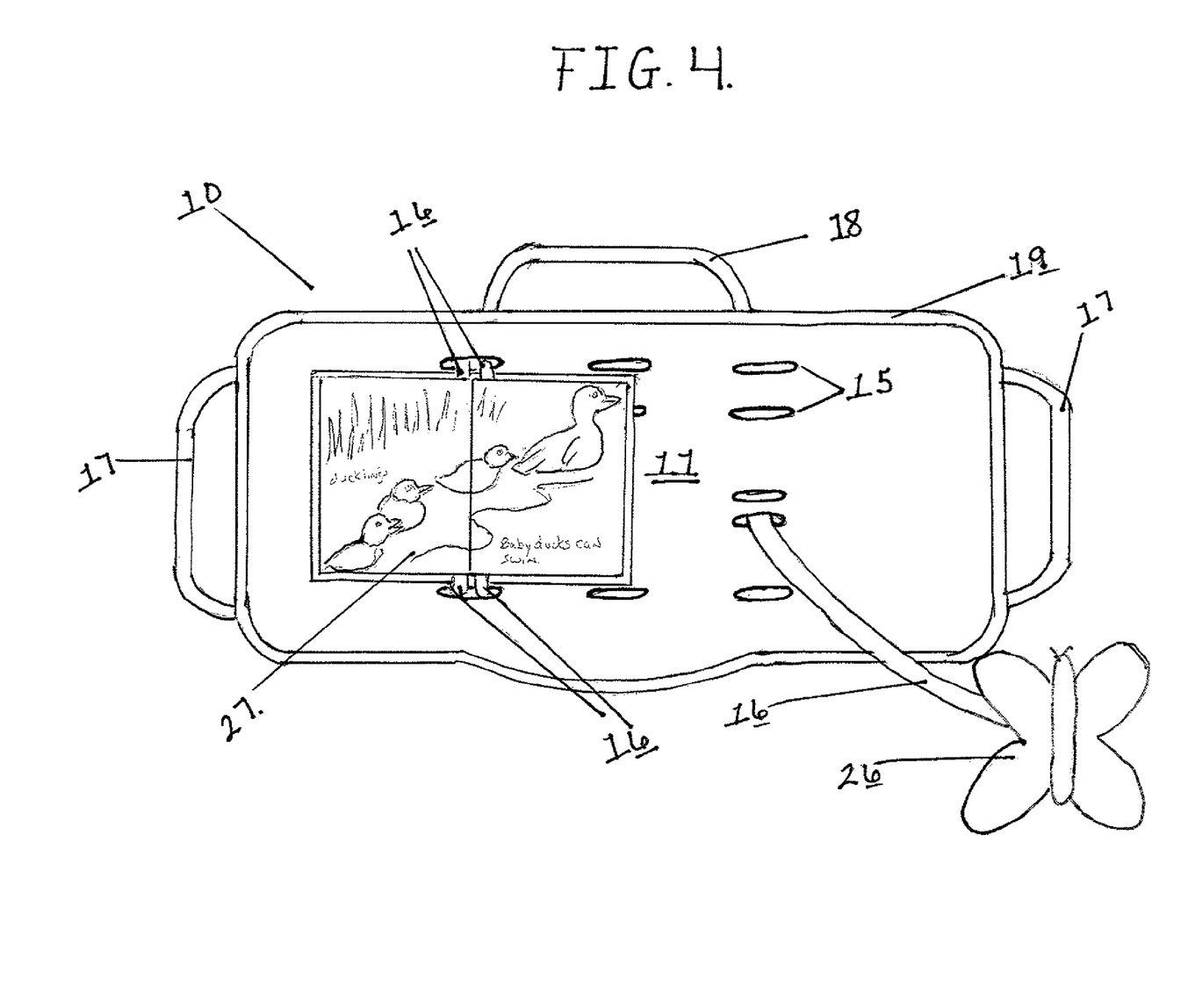
FIG. 4 is a top plan view of the Secured Children's Book and Toy Holder (10) of FIG. 1 having a child's book (27) and toy (26) attached with pads of mating hook and loop fastener material connector (20) ribbons (16)
Figure 5:
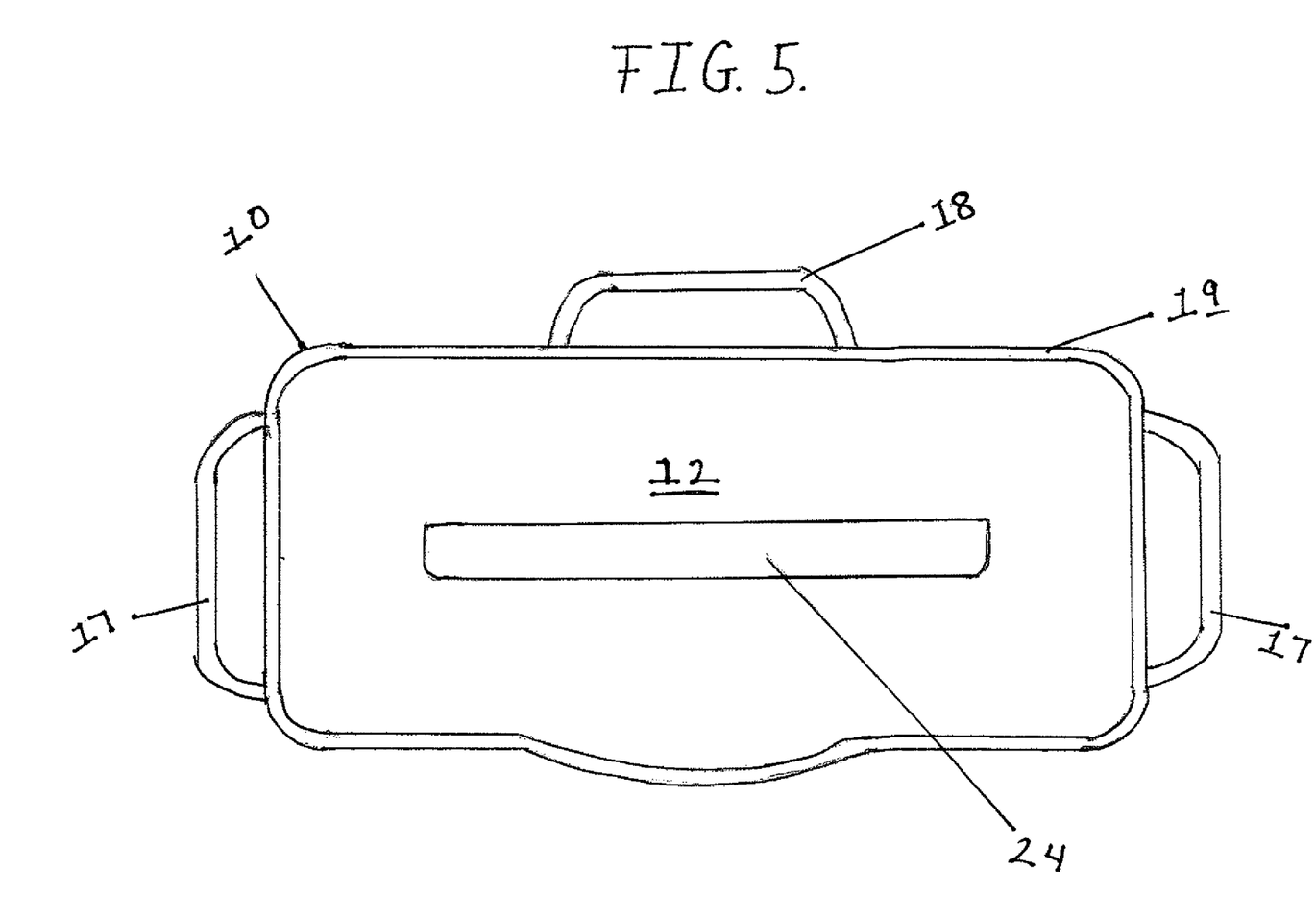
FIG. 5 is an outside plan view of the Secured Children's Book and Toy Holder (10) bottom panel (12) according to an embodiment of the present invention.
Figure 6:
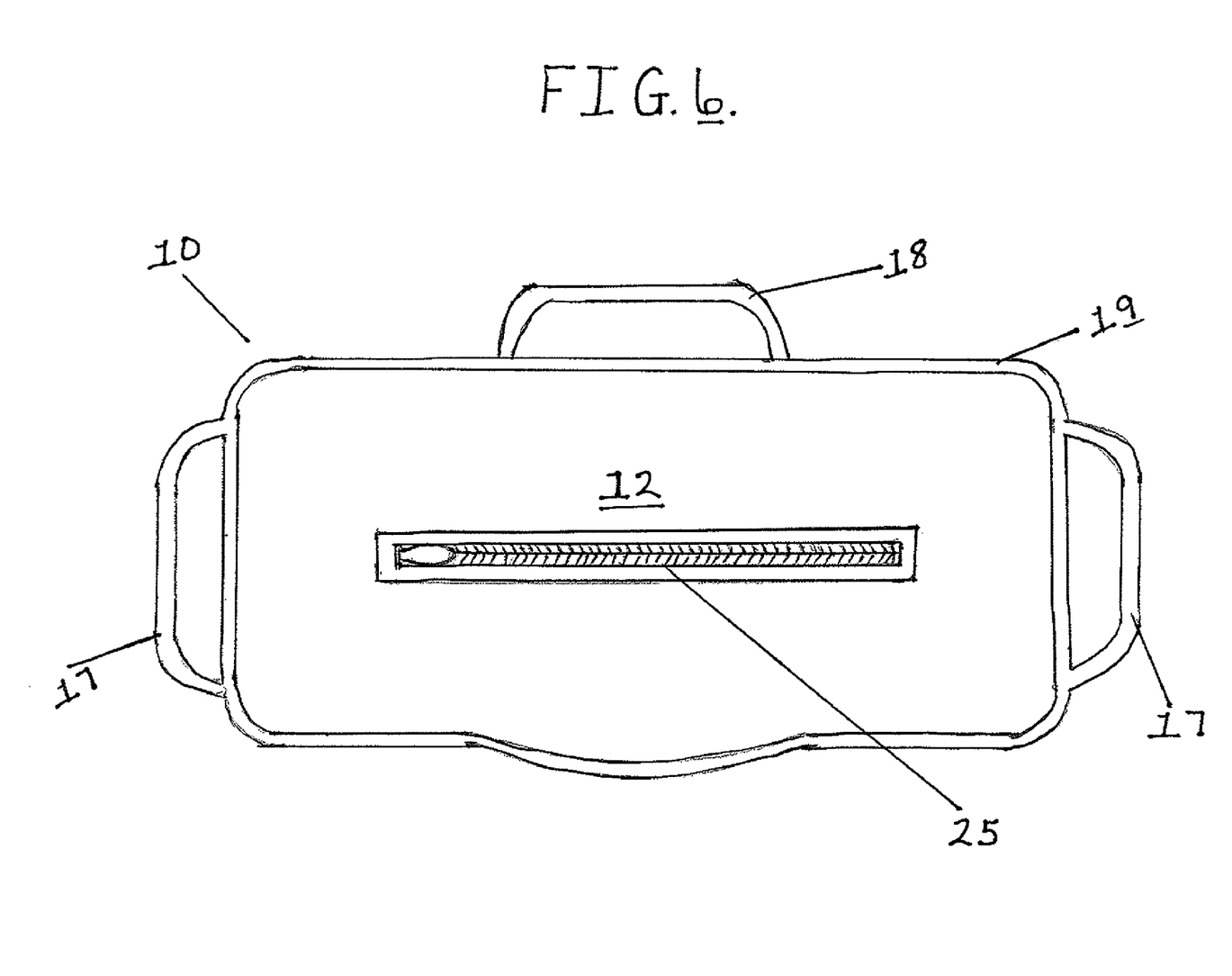
FIG. 6 is an inside plan view of an alternate embodiment of the Secured Children's Book and Toy Holder (10) Bottom Panel (12) of FIG. 5.
Figure 7:
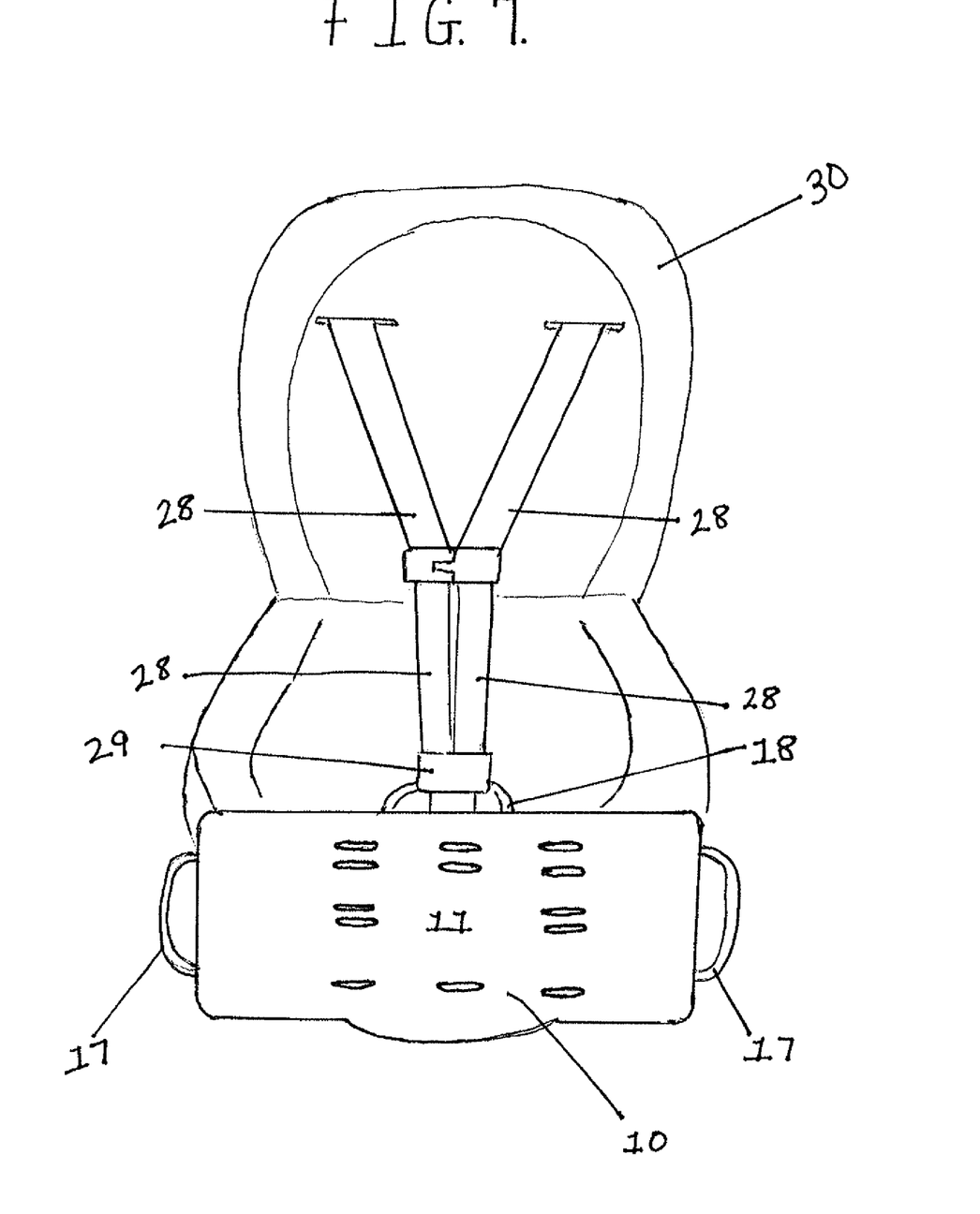
FIG. 7 is a front elevation of a typical car seat (30) and stroller safety harness (28, 29) for children.

FIGS. 1 through 2 and figures FIGS. 5 through 6 illustrate the Secured Children's Book and Toy Holder (10) for a child's car seat (30), stroller, or other children's safety transport device equipped with safety harness restraints (28, 29). The Secured Children's Book and Toy Holder top panel (11) shown in FIGS. 1 and 2 is sewn together with the Secured Children's Book and Toy Holder bottom panel (12) shown in FIGS. 5 and 6 to form the Secured Children's Book and Toy Holder (10). FIG. 3 illustrates the pads of mating hook and loop fastener material connector (20) ribbons (16) that connect a child's book (27) to the Secured Children's Book and Toy Holder (10). FIG. 4 illustrates the Secured Children's Book and Toy Holder (10) with a child's book (27) attached. FIG. 7 illustrates a frontal view of how the Secured Children's Book and Toy Holder (10) is attached to the safety harness restraints (28, 29) of a typical child's car seat (27).

Most car seats, strollers, or other children's safety transport devices make use of a restraining harness (28, 29) that consists of two shoulder straps (28) connecting into the between-the-legs restraining clip (29). This restraining harness (28, 29) is the typical mechanism to hold the child into the car seat or other transport device. As shown in FIG. 7 the Secured Children's Book and Toy Holder (10) is attached to the car seat by passing the connector loop (18) over the between-the-legs restraining clip (29) and then attaching the two shoulder straps (28) into the between-the-legs restraining clip (29) once the child is seated in the car seat. This allows the Secured Children's Book and Toy Holder (10) to rest on the child's lap positioned horizontally and parallel to the seat position of the car seat. Older models of car seats and some strollers or other children's transport devices use lap belts to restrain the child. When a lap belt is used as the primary child restraint, the lap belt would pass through the Secured Children's Book and Toy Holder connector loop (18) to secure the Secured Children's Book and Toy Holder (10) to the traveling device and allows the Secured Children's Book and Toy Holder (10) to rest on the child's lap positioned horizontally and parallel to the seat position of the traveling device.

FIG. 1 illustrates the construction of Secured Children's Book and Toy Holder's top panel (11) which has thirteen reinforced buttonholes (15) aligned into three parallel columns which serve as insert points for the book and toy pads of mating hook and loop fastener material connector (20) ribbons (16). The connector loop (18) is used to connect the Secured Children's Book and Toy Holder (10) to the car seat, stroller, or other traveling device. The handles (17) when folded together provide an easy method for parents to carry the Secured Children's Book and Toy Holder (10) when not attached to the car seat. The exterior edge of the Secured Children's Book and Toy Holder top panel (11) when sewn together with the bottom panel (12) is reinforced with "piping" (19). (The term "piping" is a sewing term defined as a small cotton cording encased in a strip of bias (diagonally cut) fabric.) In order to attach a children's book to the Secured Children's Book and Toy Holder, the twin connector ribbons (16) illustrated in FIG. 3 are inserted between the front cover and first page and the back cover and last page of a children's book and pushed to rest up against the book's binding. The pads of mating hook and loop fastener material connector ends (20) are then passed through an upper and lower buttonhole (15) (FIG. 1) in a vertical row and pulled tightly, thereby, securing the book and/or toys to the top panel (11) by connecting the two pads of mating hook and loop fastener material connectors (20) attached to the twin connector ribbons (16) as illustrated in FIG. 2. The underside of the top panel is reinforced with medium weight interfacing (21) to provide strength, support, and durability (FIG. 2) throughout the top panel. A fleece panel (22) is also attached to provide additional strength, support, and durability for each of the top panel's buttonholes (15) and support for the children's books (27). Attached to the underside of the top panel, on top of the fleece panel, are two strips of pads of mating hook and loop fastener material (23) that enable the attachment of pads of mating hook and loop fastener material ribbon connector (16, 20) to attach toys made for the Secured Children's Book and Toy Holder or any other hand held toy that can be attached using the aforementioned mechanism.

FIG. 5 and FIG. 6 illustrate the construction of the Secured Children's Book and Toy Holder's bottom panel (12) which is designed to provide parental access to the inside of the top panel (11). Access is achieved through the covered panel (24) zipper (25). Access is needed to attach or release the ribbon connectors (16) by connecting or separating the pads of mating hook and loop fastener material connector ends (20). By so doing, the parent is able to attach or release the children's books and toys from the top panel (11). The covered zipper panel (24) conceals the zipper (25) from the eyes of the child and access is on the bottom panel (12) to keep the access point from the view of the child.

That which is claimed:

1. A book and toy holder for attachment to an infant carrier including safety harness restraints, comprising:
   a. a top rectangular cotton fabric panel which has thirteen reinforced buttonholes aligned into three parallel columns which serve as insert points for a plurality of connector ribbons which will hold in place multiple children's books and toys; and
   b. a connector loop attached to a lower side of said top rectangular fabric panel for providing a secure connection to said infant carrier's safety harness restraints by passing said restraints through said connector loop; and
   c. a first rectangular panel of medium weight interface fabric having the same dimensions as said top rectangular fabric panel, said first rectangular panel being sewn on to a bottom side of said top rectangular fabric panel to provide strength, support, and durability; and
   d. a second rectangular panel made of fleece fabric two thirds the size of said top rectangular fabric panel, said second rectangular panel being sewn on to said bottom side of said top rectangular fabric panel to provide additional strength, support, and durability for each of the said thirteen buttonholes, said buttonholes passing through each of the top, first, and second rectangular panels; and
   e. two rectangular strips of pads of mating hook and loop fastener material being sewn to an underside of said second rectangular panel that enable the attachment of at least one of said connector ribbons for supporting lightweight infant toys; and
   f. two carrier handles attached one on each of left and right ends of said top rectangular fabric panel to provide an easy method to carry said book and toy holder when not connected to said harness restraints; and
   g. a plurality of connector ribbon attachments that are passed through said buttonholes to secure a children's books and toys to said top rectangular panel; and
   h. a bottom rectangular cotton fabric panel, sized to match the exact same dimensions of said top rectangular fabric panel, stitched to said underside of said top rectangular panel, said bottom rectangular panel having a covered panel zipper sewn into the horizontal center thereof providing the only means of non-infant/toddler access to said underside of the top rectangular panel for attachment or removal of said connector ribbon attachments from said buttonholes while also obscuring the infants view of said connector ribbon attachments.

2. The book and toy holder of claim 1, wherein at least one of said connector ribbon attachments is designed to allow the attachment of infant books to the book and toy holder by providing two parallel fabric ribbons of equal length that are joined at both ends with pads of mating hook and loop fastener material, one end of the parallel connector ribbons being passed through an upper buttonhole on a front of said top rectangular fabric panel and an opposite end of said parallel connector ribbon being passed through a lower buttonhole in the same vertical row of the upper buttonhole and the pads of mating hook and loop fastener material pressed together to form a secure connection for said books, said connection for all pads of mating hook and loop fastener material are located securely between said top and bottom rectangular panels and out of sight and reach of said infant/toddler.

3. The book and toy holder of claim 1, wherein at least one of said connector ribbon attachments comprises a connection mechanism designed to allow the attachment of infant toys to the book and toy holder by one fabric ribbon that is attached to an infant's toy on one end of said ribbon and a pad of mating hook and loop fastener material on an opposite end, the end of said connector ribbon with the pad of mating hook and loop fastener material being passed through one of the buttonholes on the front of said top rectangular fabric panel and pressed onto one of the two rectangular strips of pads of mating hook and loop fastener material sewn to the underside of said top panel.

\* \* \* \* \*